United States Patent

[11] 3,583,244

[72] Inventor Karl-Heinz Telnert
Essen-Steele, Germany
[21] Appl. No. 798,029
[22] Filed Feb. 10, 1969
[45] Patented June 8, 1971
[73] Assignee Gelenkwellenbau G.m.b.H.
Westendhof, Essen, Germany
[32] Priority Feb. 9, 1968
[33] Austria
[31] 1234/68

[54] DEVICE FOR SEALING THE INTERIOR SPACE OF A HOMOKINETIC UNIVERSAL JOINT
13 Claims, 7 Drawing Figs.

[52] U.S. Cl. .................................................. 74/18.1, 64/21
[51] Int. Cl. .................................................. F16j 15/54
[50] Field of Search ............................................ 74/18.1, 18; 64/8, 21

[56] References Cited
UNITED STATES PATENTS

| | | | |
|---|---|---|---|
| 2,426,701 | 9/1947 | Miller, Jr. ................ | 74/18.1X |
| 2,510,362 | 6/1950 | Anderson .................. | 74/18.1X |
| 2,579,356 | 12/1951 | Anderson .................. | 64/21 |
| 3,204,427 | 9/1965 | Dunn ........................ | 64/8 |
| 3,404,573 | 10/1968 | Cull et al. ................. | 74/18 |
| 3,452,558 | 9/1969 | Cull et al. ................. | 64/21 |

*Primary Examiner*—Fred C. Mattern, Jr.
*Assistant Examiner*—F. D. Shoemaker
*Attorneys*—Curt M. Avery, Arthur E. Wilfond, Herbert L. Lerner and Daniel J. Tick ABSTRACT: Device for sealing the lubricant-containing interior of a homokinetic universal joint or constant velocity joint for two rotary shafts includes a bellows-type packing ring having larger and smaller diameter ends, a ring flange coaxial to the packing ring and adapted for mounting on one of the two shafts, the ring flange having a peripheral surface whereon the larger diameter end of the packing ring is secured, the smaller diameter end of the packing ring being adapted for mounting on the other of the two rotary shafts, and stiffening means abutting against an outer surface portion of the packing ring at the larger diameter end thereof, the stiffening means serving for bracing the packing ring in the region radially beyond the surface of the lubricant ring formed in rotating condition of the joint against outward bulging thereof due to hydraulic pressure exerted thereon by the lubricant ring.

DEVICE FOR SEALING THE INTERIOR SPACE OF A HOMOKINETIC UNIVERSAL JOINT

My invention relates to device having a bellows-type packing ring for sealing the lubricant-containing interior space of a homokinetic universal joint or constant velocity joint for connecting two rotary shafts and, more particularly, a homokinetic universal joint having joint halves, respectively connected to one of the two shafts, the joint halves being axially displaceable. The packing ring of such sealing device has a larger diameter end secured to the peripheral surface of an axial ring flange mounted on one of the two rotary shafts, and a smaller diameter end mounted on the other of the two rotary shafts.

Whereas the heretofore known sealing devices of the aforementioned construction, which have packing rings provided with sawtooth folds or a single fold, are very durable at normal or relatively limited rotary speeds of the shafts, impairments of the packing rings are experienced in the vicinity of the larger diameter end thereof at relatively higher rotary speeds. It has been found that the cause of these impairments is attributable to the pressure appearing in the lubricant ring that forms in the radially outer portion of the sealed interior space of the universal joint due to the effect of centrifugal force. The pressure produced in the lubricant ring causes the packing ring to bulge outwardly and rupture in the vicinity of the larger diameter securing end thereof. The heretofore known embodiments of the aforementioned type of sealing device are therefore only applicable for reduced rotary speeds of the shafts.

It is accordingly an object of my invention to provide sealing device for sealing the lubricant-containing interior of a homokinetic universal joint which avoids the aforementioned disadvantages of the heretofore known sealing devices of this general type. More particularly, it is an object of my invention to provide such sealing device which can be used without damage thereto at relatively high rotary speeds of the shafts.

A general object of my invention is to provide sealing device for the lubricant-filled interior space of a universal joint of the aforementioned type which affords relatively great durability of the packing ring thereof even when the joint is rotated at relatively high rotary speed.

With the foregoing and other objects in view, I provide device for sealing the lubricant-containing interior of a homokinetic universal joint for two rotary shafts comprising a bellows-type packing ring having larger and smaller diameter ends, a ring flange coaxial to the packing ring and adapted for mounting on one of the two shafts, the ring flange having a peripheral surface whereon the larger diameter end of the packing ring is secured, the smaller diameter end of the packing ring being adapted for mounting on the other of the two rotary shafts, and stiffening means secured to an outer surface portion of the packing ring radially beyond the surface of the lubricant ring formed in rotating condition of the joint at the larger diameter end of the packing ring, the stiffening means serving for bracing the packing ring against outward bulging thereof due to hydraulic pressure exerted thereon by the lubricant ring.

In accordance with a further feature in one embodiment of my invention, the stiffening means comprises a ring corresponding in cross section to that of the packing ring and secured by vulcanization or adhesive to the aforementioned outer surface portion of the packing ring. The stiffening ring thus permits the packing ring to be elastically yieldable while simultaneously preventing any danger of the outward bulging thereof.

In accordance with another feature in a second embodiment of my invention, the stiffening means is formed of a ring portion secured to the aforementioned one of the two shafts, which also prevents axial expansion or bulging of the packing ring at the aforementioned outer surface portion of the packing ring.

In accordance with an added feature of my invention, I provide the sealing device with a packing ring which, adjacent the axially extending securing end thereof having greater diameter, is initially curved backwards so as to form a backwardly projecting fold extending axially in the sealed inner space of the joint, and a stiff ring located at the inner side of the packing ring at a region radially beyond the surface of the lubricant ring for bracing the packing ring. This stiff ring is advantageously of integral construction with a packing ring holder having a peripheral surface on which the large diameter end of the packing ring is secured. If the packing ring is also braced on the outer surface thereof by the ring portion secured to the one shaft, it is consequently braced on both sides in the vicinity of the lubricant ring.

In accordance with still another feature of my invention I provide the sealing device for sealing the inner space of a universal joint wherein the lubricant ring is located so far inwardly that a marked length of the backwardly curved portion of the packing ring is located outside of the surface of the lubricant ring. The backwardly bent portion of the packing ring is braced by the stiff ring up to about the level of the surface of the lubricant ring. The backwardly bent portion of the packing ring is then able to abut the stiff ring when subjected to centrifugal force, so that the hydraulic pressure of the lubricant ring cannot be effective against the same in this region.

In accordance with an additional feature of my invention, the sealing device includes a packing ring formed with an axially extending forwardly curved fold located adjacent the axially extending securing end of the packing ring having larger diameter, and a conically tapering sleeve secured to an outer surface portion of the packing ring radially beyond the surface of the lubricant ring for bracing the packing ring against bulging thereof.

In accordance with another feature of my invention, I provide a sleevelike or umbrellalike protective sheet firmly connected to or integral with the outer ring, the ring portion or the conically tapering sleeve for protecting the packing ring against undesired outer influences.

Other features which are considered as characteristic for the invention are set forth in the appended claims.

Although the invention is illustrated and described herein as embodied in device for sealing the interior space of a universal joint, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

The halves of the embodiment not shown in the figures are mirror images of the illustrated halves, and all similar elements in the figures bear the same reference characters.

Figure 1:
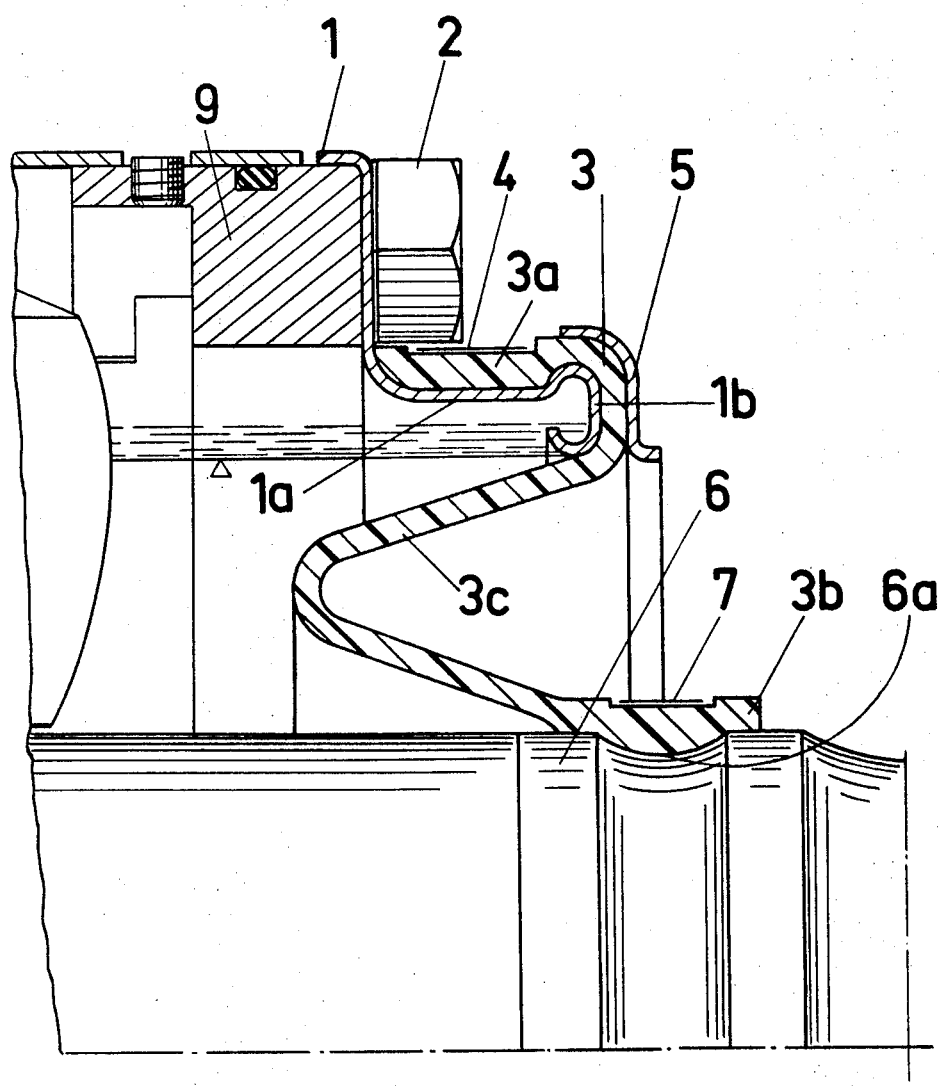
FIG. 1 is a longitudinal sectional half-view of one embodiment of the sealing device of my invention having a packing ring and a ring vulcanized or adhesively affixed thereto.

Referring now to the drawings and first particularly to FIG. 1 thereof there is shown a device for sealing the inner space of a universal joint which includes a packing ring holder 1 that is fastened by screws 2 to a shaft 9 and has an axially extending ring flange 1a. A recess or depression is impressed in the peripheral outer surface of the ring flange 1a wherein a correspondingly shaped outer end 3a of a roll bellows-type packing ring 3 is inserted and secured by a clip or clamp 4. The axially extending ring flange 1a is formed at the free end thereof with a stiff radially extending ring 1b which projects inwardly to the level substantially of the surface of the lubricant ring formed within the interior space of the universal joint during operation thereof i.e. when the universal joint is rotating with the shafts. The packing ring 3 is bent around the stiff ring 1b and is curved backward so that it extends radially inwardly of the lubricant ring surface in axial direction initially and then curved forwardly and extending radially inwardly again so as to form a nonbraced portion 3c of the packing ring 3 having a V-shaped profile. The bisector of the V is disposed substantially parallel to a shaft 6 to which a smaller diameter end 3b of the packing ring 3 is secured by means of a clip or clamp 7 in a conventional manner within a peripheral groove 6a formed in the shaft 6.

In the region radially outward of the surface of the lubricant ring, a ring 5 having a contour corresponding to that of the packing ring curve is vulcanized onto or adhesively secured to the outer surface of the packing ring 3. The ring 5 braces the packing ring 3 against bulging thereof due to pressure exerted in the lubricant ring by centrifugal force.

Figure 2:
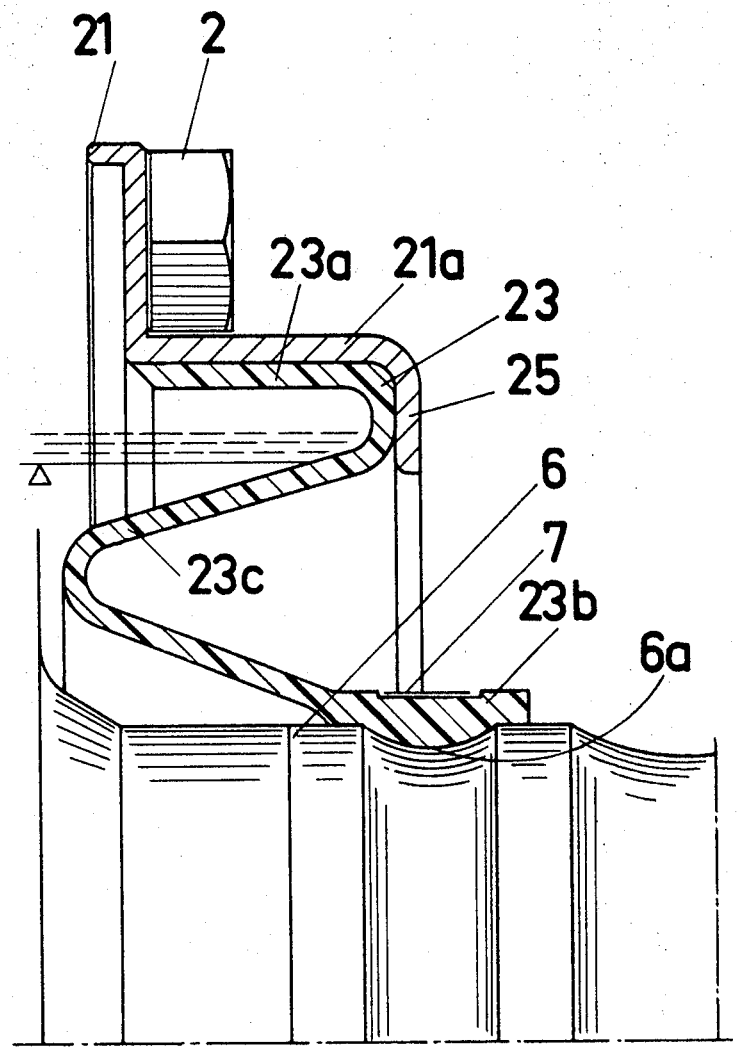
FIG. 2 is a like view of another embodiment of FIG. 1 wherein the packing ring is braced at the outside thereof by a ring portion secured to the shaft other than the one to which the packing ring is directly secured.

In the embodiment of FIG. 2, a radially extending ring portion 25 is integral with the axially extending ring flange 21a of the packing ring holder 21. Both the axially extending ring flange 21a and the ring portion 25 have an inner contour conforming to the outer profile of the radially outer end 23a of the packing ring 23 and is vulcanized or adhesively secured thereto. Moreover, the free or unbraced portion 23c of the packing ring 23 has the same shape and the inner securing end 23b is secured to the second shaft 6 in the same manner as are the corresponding parts 3c and 3b of the embodiment of FIG. 1.

Figure 3:
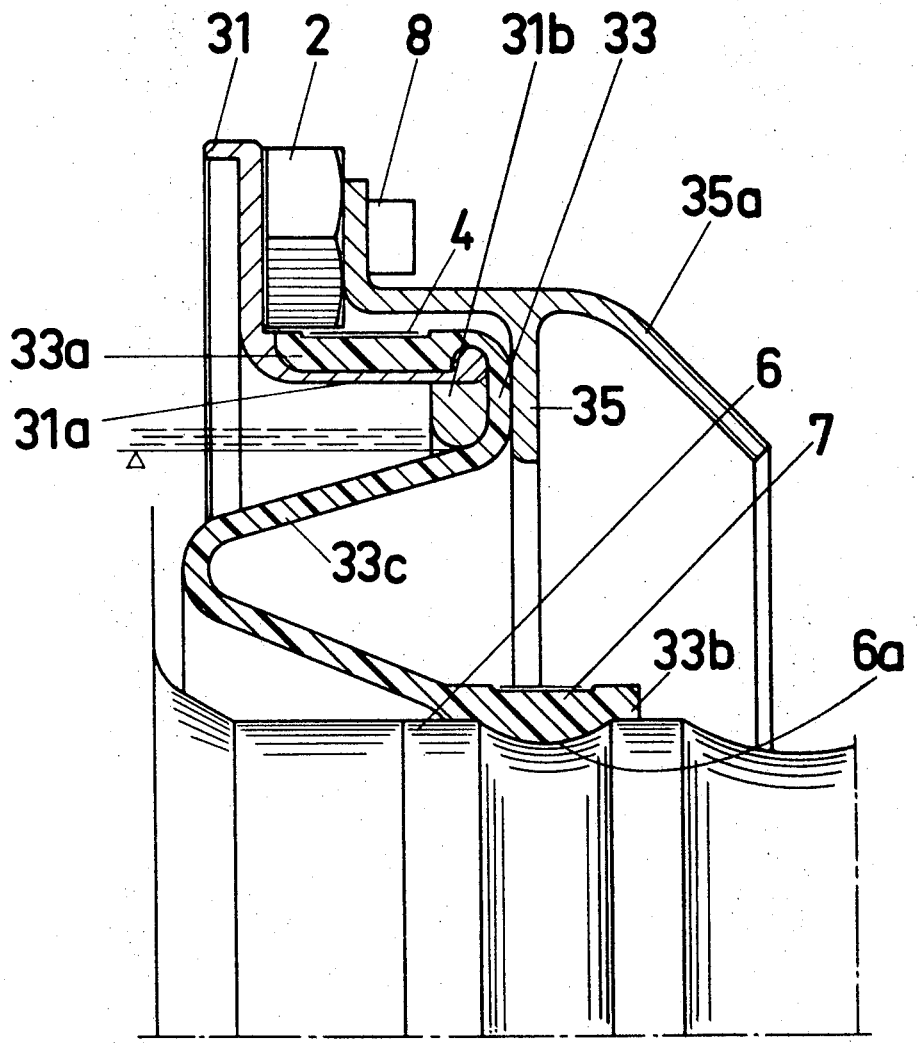
FIGS. 3, 4 and 5 are like views of other embodiments of the invention wherein the packing ring is additionally braced at the inner side thereof by a stiff ring which, in the embodiments of FIGS. 4 and 5, is moreover integral with a holder for the packing ring.

In the embodiment of FIG. 3, the unbraced fold portion 33c has the same shape as its counterparts 3c and 23c of FIGS. 1 and 2 respectively, and the inner securing end 33b is secured in the same manner as the corresponding securing ends 3b and 23b respectively of FIGS. 1 and 2 to the second shaft 6. The construction of the embodiment of FIG. 3 differs from that of FIG. 2 in that the radially outer end 33a of the packing ring 33, in a manner similar to that of the outer end 3a of FIG. 1, is secured to the outer periphery of the axially extending ring flange 31a of the packing ring holder 31 by means of a tensioning clip or clamp 4. The embodiment of FIG. 3 differs from that of FIG. 1 in that the stiff ring portion 35 is not adhesively secured to the outer side of the packing ring 33 as the ring 5 of FIG. 1, for example, is adhesively secured to the outer side of the packing ring 3. Instead, the radially extending inner surface of the ring portion 35 of FIG. 3 abuts the packing ring 33 in the vicinity of the lubricant ring formed therein, and is fastened to the screw 2 by means of a screw 8. The ring portion 35 is furthermore firmly connected or integral with a conically tapering protective plate or sheet 35a for protecting the universal joint from impact with flying stones or other undesired effects. Furthermore, the stiff ring 31b, which serves the equivalent function of the ring portion 1b of FIG. 1, and which is located at the inner surface of the packing ring 33 of the embodiment shown in FIG. 3, is in the form of a separate member which is connected to the axially extending ring flange 31a of the packing ring holder 31, for example, by welding or soldering.

Figure 4:
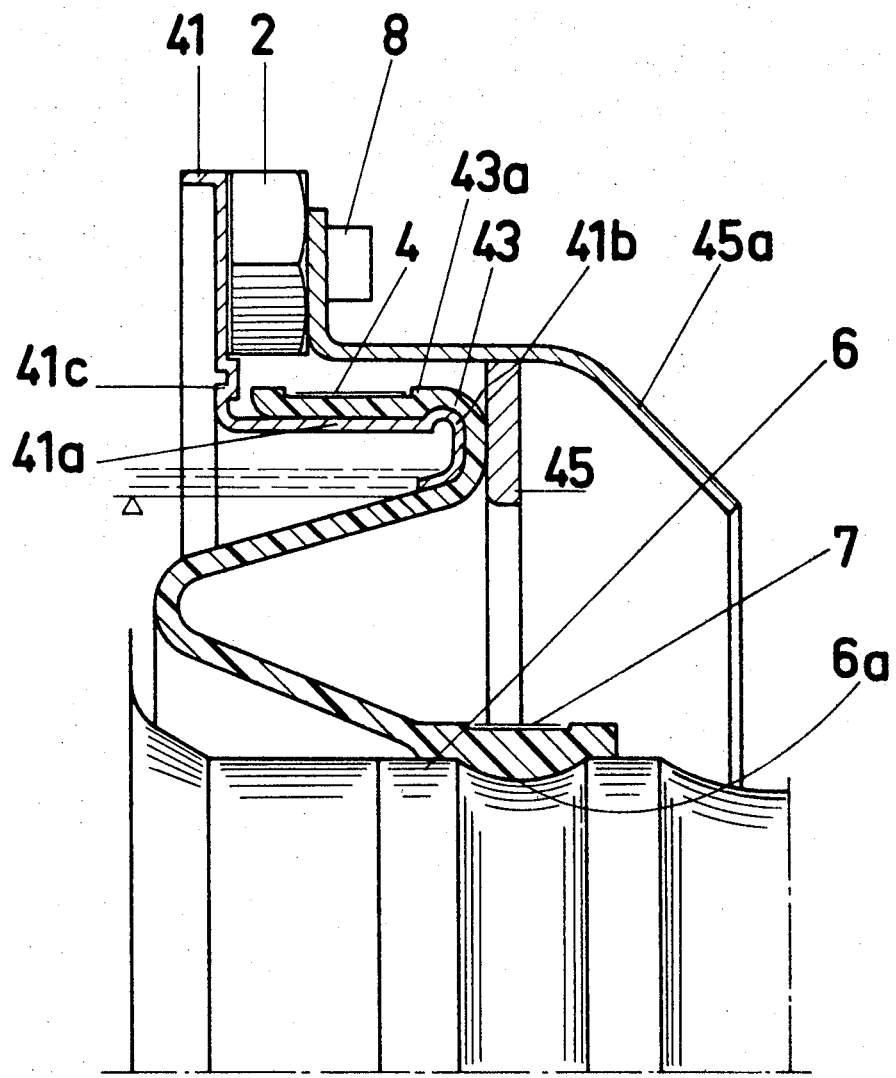

The embodiment of FIG. 4 differs from that of FIG. 3 only in that the axially extending ring flange 41a of the packing ring holder 41 is again integral with the ring 41b, and by the additional provision of an axially extending projection 41c impressed in the packing ring holder 41 to ensure the ability to turn the screw 2 and space the underside of the latter, as viewed in FIG. 4, from the radially outer end 43a of the packing ring 43. In this embodiment of FIG. 4, the ring portion 45 and the protective sheet 45a are not integral, as are the corresponding elements in the embodiment of FIG. 3, but are rather separate elements that are connected to one another, for example, by welding.

Figure 5:
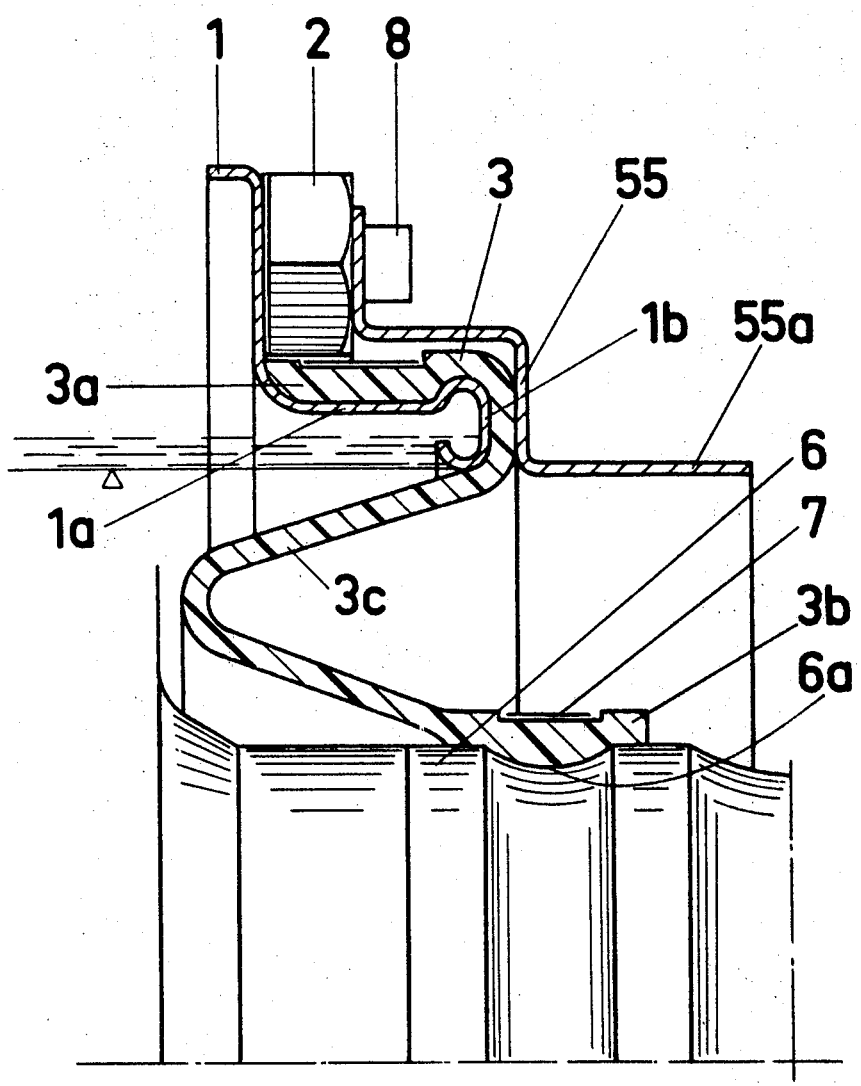

FIG. 5 shows an embodiment of my invention having a ring portion 55 abutting the packing ring 3 and fastened with a screw 8 to the screw or bolt 2 that secures the packing ring holder 1 to the first shaft 9. A protective sheet or plate is provided in the form of a sleevelike portion 55a axially projecting forward from the inner end of the ring portion 55. Otherwise, the structure of the embodiment of FIG. 5 corresponds substantially to that of the embodiment of FIG. 1.

Figure 6:
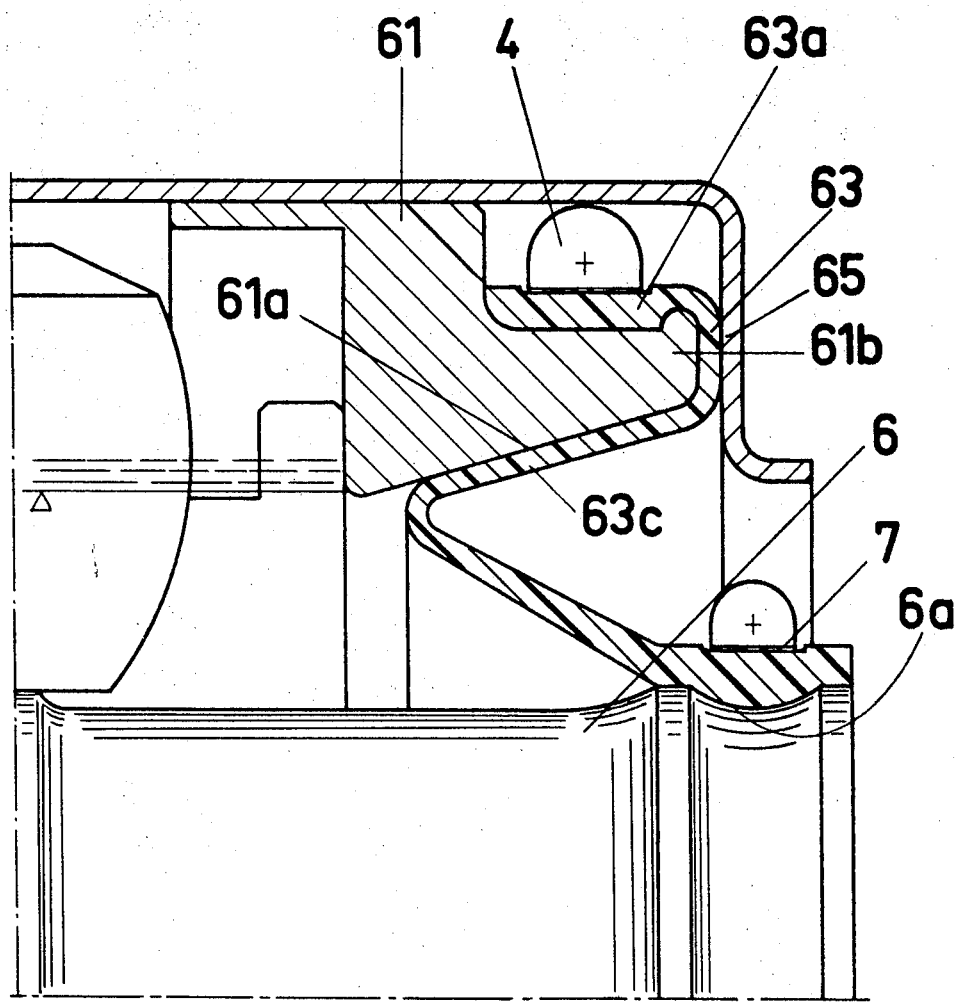
FIG. 6 is a like view of a further embodiment of the invention wherein the surface of the lubricant ring formed in the interior of the joint is comparatively farther radially within the inner space of the universal joint.

In the embodiment of the sealing device of my invention illustrated in FIG. 6, the surface of the lubricant ring is located considerably farther radially within the inner space of the universal joint than in those embodiments described hereinbefore, so that the lubricant ring covers an appreciable region of the unbraced, backwardly curved portion 63c of the packing ring 63. The packing ring holder of the embodiment of FIG. 6 is accordingly constructed in the form of a massive ring 61 having an outer contour corresponding to the contour of the inner surface of the packing ring 63. During operation of the shafts and the universal joint, the unbraced backwardly curved portion 63c of the packing ring 63 presses against the inner wall surface 61a of the ring 61 due to the action of centrifugal force on the portion 63c. The packing ring holder 61 is completely covered by the ring portion 65 which simultaneously serves as the protective plate or sheet, the packing ring 63 being thereby completely encapsulated in the region of the radially outer securing end 63a thereof.

Figure 7:
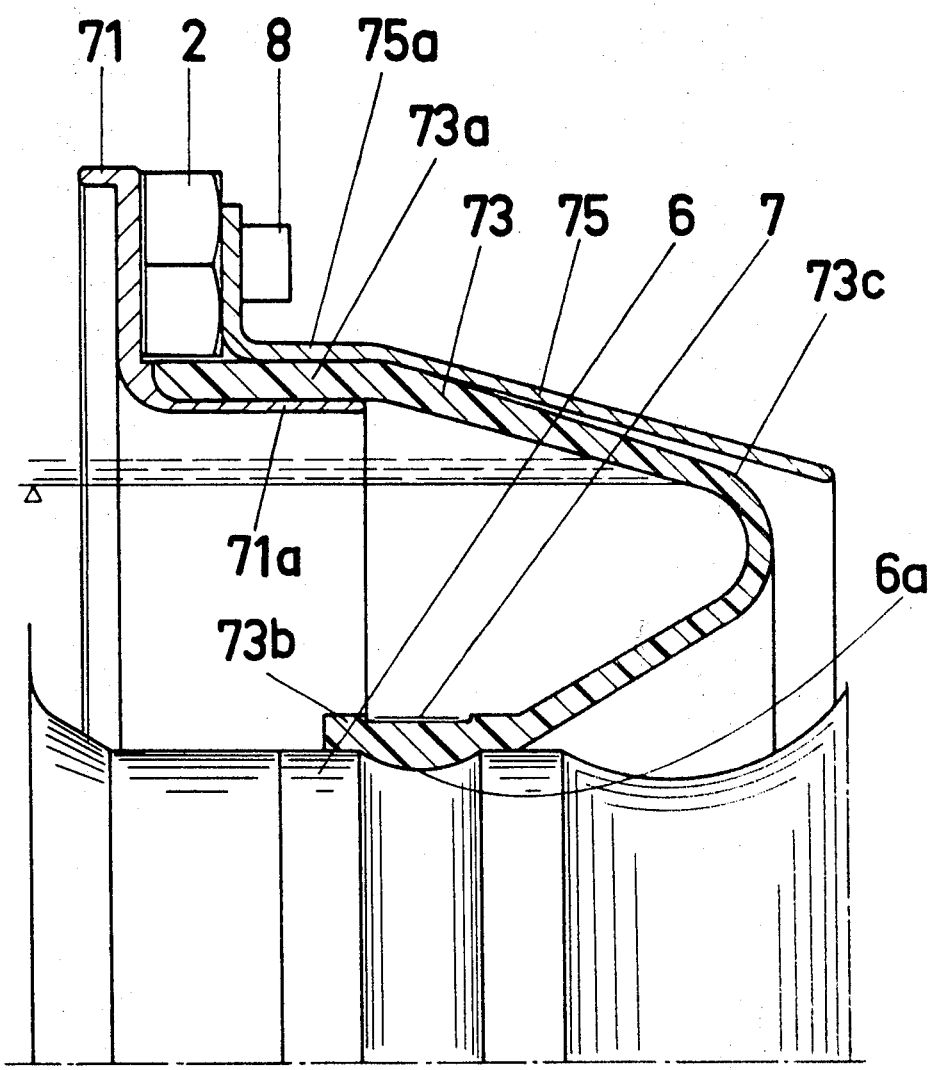
FIG. 7 is a like view of yet another embodiment of the invention shown in the preceding figures wherein the packing ring is formed with an axially extending forwardly curved fold.

In the embodiment of FIG. 7, the packing ring 73 is only slightly bent adjacent the axially extending outer securing end 73a thereof and forms an axially forwardly curved fold 73c. A part of the forwardly curved region of packing ring 73 thus lies outside the surface of the lubricant ring and is therefore braced by a conically tapering sleeve 75 located outside the packing ring 73. While the packing ring 73 of the sealing device embodiment of FIG. 7 is clamped at the outer securing end 73a thereof solely between the axially extending ring flange 71a of the packing ring holder 71 and an axially extending ring portion 75a of the sleeve 75, the inner securing end 73b of the packing ring 73 is secured, as in each of the preceding embodiments of my invention, by a tensioning clip or clamp 7 in a groove 6a formed in the shaft 6.

I claim:

1. Device for sealing the lubricant-containing interior of a homokinetic universal joint for two rotary shafts comprising a bellows-type packing ring having larger and smaller diameter ends, a movable ring portion located between said larger and said smaller diameter ends and a backwardly curved ring portion located between said larger end and said movable ring portion, a ring flange coaxial to said packing ring and adapted for mounting on one of the two shafts, said ring flange having a peripheral surface whereon the larger diameter end of said packing ring is secured, the smaller diameter end of said packing ring being adapted for mounting on the other of the two rotary shafts, and stiffening means abutting the outer surface of said backwardly curved ring portion of said packing ring, said stiffening means serving for bracing said packing ring at said backwardly curved ring portion in a region radially beyond the surface of the lubricant ring formed in rotating condition of the joint against outward bulging thereof due to hydraulic pressure exerted thereon by said lubricant ring.

2. Sealing device according to claim 1 wherein said stiffening means comprises a stiffening ring having an inner contour corresponding to the outer contour of said packing ring at said backwardly curved ring portion thereof and secured to said outer surface portion of said packing ring.

3. Sealing device according to claim 2 wherein said stiffening ring is secured by vulcanization to said outer surface portion.

4. Sealing device according to claim 2 wherein said stiffening ring is secured by adhesive to said outer surface portion.

5. Sealing device according to claim 1 wherein said stiffening means forms a portion of said ring flange.

6. Device for sealing the lubricant-containing interior of a homokinetic universal joint for two rotary shafts comprising a bellows-type packing ring having larger and smaller diameter ends, a ring flange coaxial to said packing ring and adapted for mounting on one of the two shafts, said ring flange having a peripheral surface whereon the larger diameter end of said packing ring is secured, the smaller diameter end of said packing ring being adapted for mounting on the other of the two rotary shafts, and stiffening means abutting against an outer surface portion of said packing ring at the larger diameter end thereof, said stiffening means serving for bracing said packing ring in the region radially beyond the surface of the lubricant ring formed in rotating condition of the joint against outward bulging thereof due to hydraulic pressure exerted thereon by said lubricant ring, said larger diameter securing end of said packing ring extending in the axial direction of said packing ring, and said packing ring adjacent said larger diameter securing end thereof being initially curved backwards so as to form a backwardly projecting fold extending axially in the sealed interior of the joint, and including a stiff ring located at the inner side of said packing ring for further bracing said packing ring in the region thereof radially beyond said surface of said lubricant.

7. Sealing device according to claim 6 wherein said stiff ring is integral with said ring flange.

8. Sealing device according to claim 6 wherein said lubricant ring is located so far inwardly in the interior of the universal joint that a considerable length of said backwardly curved portion of said packing ring is located outside said surface of said lubricant ring, said stiff ring being in bracing abutment with said backwardly curved portion substantially to the level of said lubricant ring surface.

9. Sealing device according to claim 1 including a protective sheet member extending from said stiffening means for protecting said packing ring from external effects.

10. Sealing device according to claim 9 wherein said protective sheet member is substantially in the form of a sleeve.

11. Sealing device according to claim 9 wherein said protective sheet member is substantially in the form of an umbrella.

12. Sealing device according to claim 9 wherein said protective sheet member is integral with said stiffening means.

13. Sealing device according to claim 9 wherein said protective sheet member is firmly connected to said stiffening means.